(12) United States Patent
Lee (10) Patent No.: US 12,202,377 B2
(45) Date of Patent: Jan. 21, 2025

(54) ELECTRIFIED VEHICLE AND POWER SOURCE MANAGEMENT METHOD FOR THE SAME

(71) Applicants: Hyundai Motor Company, Seoul (KR); Kia Corporation, Seoul (KR)

(72) Inventor: Jung Hyun Lee, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 270 days.

(21) Appl. No.: 17/861,590

(22) Filed: Jul. 11, 2022

(65) Prior Publication Data

US 2023/0211702 A1 Jul. 6, 2023

(30) Foreign Application Priority Data

Dec. 31, 2021 (KR) .................. 10-2021-0194634

(51) Int. Cl.
| | | |
|---|---|---|
| *B60L 58/18* | (2019.01) | |
| *B60L 50/60* | (2019.01) | |
| *B60L 53/20* | (2019.01) | |
| *B60L 53/53* | (2019.01) | |
| *B60L 53/80* | (2019.01) | |
| *B60L 58/12* | (2019.01) | |
| *B60L 58/16* | (2019.01) | |

(Continued)

(52) U.S. Cl.
CPC .............. *B60L 58/18* (2019.02); *B60L 50/60* (2019.02); *B60L 53/20* (2019.02); *B60L 53/53* (2019.02); *B60L 53/80* (2019.02); *B60L 58/12* (2019.02); *B60L 58/16* (2019.02); *H02J 7/0013* (2013.01); *H02J 7/007* (2013.01); *H02J 7/342* (2020.01); *B60L 2240/12* (2013.01); *B60L 2240/421* (2013.01); *B60L 2240/48* (2013.01); *H02J 2207/20* (2020.01)

(58) Field of Classification Search
CPC .......... B60L 58/18; B60L 53/20; B60L 53/53; B60L 58/12; B60L 58/16; B60L 53/80; H02J 7/342; H02J 7/0013; H02J 7/007
See application file for complete search history.

(56) References Cited

U.S. PATENT DOCUMENTS

| | | | |
|---|---|---|---|
| 2016/0272085 A1* | 9/2016 | Dai ................... | B60H 1/00571 |
| 2021/0273270 A1* | 9/2021 | Fujikawa ............... | B60L 58/12 |
| 2023/0333170 A1* | 10/2023 | Kim ..................... | H02J 7/0048 |

(Continued)

*Primary Examiner* — Peter D Nolan
*Assistant Examiner* — Mikko Okechukwu Obioha
(74) *Attorney, Agent, or Firm* — Fox Rothschild LLP (57) ABSTRACT

An electric vehicle may be equipped with a swappable battery, and a power source management method. The electric vehicle includes a motor, an inverter configured to exchange three-phase power with the motor, a main battery unit which may be electrically connected to the inverter, includes a first battery and a first BMS for controlling the first battery, and may be fixedly disposed in the electric vehicle, an OBC which may be connected between the main battery unit and the inverter and includes a DC converter, and a switch unit configured to selectively connect a connector and the DC converter to each other, or the connector and the motor to each other, in which, when a swappable battery unit including a second battery and a second BMS for controlling the second battery may be connected to the connector, the first BMS acquires second-battery information output by the second BMS.

18 Claims, 9 Drawing Sheets

(51) Int. Cl.
*H02J 7/00* (2006.01)
*H02J 7/34* (2006.01)

(56) References Cited

U.S. PATENT DOCUMENTS

2023/0396074 A1* 12/2023 Takao .................. H02J 7/0031
2024/0044999 A1* 2/2024 Park .................. G01R 31/3835

* cited by examiner

ELECTRIFIED VEHICLE AND POWER SOURCE MANAGEMENT METHOD FOR THE SAME

This application claims under 35 U.S.C. § 119 (a) the benefit of Korean Patent Application No. 10-2021-0194634, filed on Dec. 31, 2021, which is hereby incorporated by reference as if fully set forth herein.

BACKGROUND OF THE DISCLOSURE

Field of the Disclosure

The present disclosure relates to an electric vehicle that may be additionally equipped with a swappable battery, and a power source management method for the same. The term "electric vehicle" refers to a range of technologies that use electricity to propel a vehicle.

Discussion of the Related Art

Recently, with the increase in interest in the environment, the number of electric vehicles each having an electric motor as a source of driving force has been increasing.

A significant number of users of electric vehicles have a short-distance urban driving pattern. However, in an electric vehicle, the charging time of a battery may be relatively long compared to the refueling time of an internal combustion engine vehicle. Thus, with electric vehicles (EV), the maximum travel distance on a single battery-full charge, so called EV mileage, may be important.

The EV mileage may be increased by increasing the size (i.e. the capacity) of the battery. However, the weight of the vehicle may be increased too, and the vehicle price may be greatly increased since the battery price accounts for a large proportion of the price of an electric vehicle.

In order to solve the problems of reduced travel distance range due to battery deterioration and the long charging time, some manufacturers consider making the battery detachable and thus replacing it with a new or fully charged one. In the case of a small vehicle such as an electric scooter, a low-voltage/low-capacity battery may be applied and a user may directly exchange the battery. However, a large-capacity battery for vehicles may be difficult to self-replace due to weight and safety issues, and thus dedicated infrastructure may be required. However, it may be necessary to ensure a site and replacement equipment at a high cost to expand the infrastructure for battery replacement, and even when the infrastructure may be in place, there may be a problem that driving becomes difficult when there may be physical damage to or burnout of a connection part or damage to a contact point as the number of replacements may be accumulated.

SUMMARY OF THE DISCLOSURE

Accordingly, the present disclosure may be directed to an electric vehicle and a power source management method for the electric vehicle that substantially obviates one or more problems due to limitations and disadvantages of the related art.

An object of the present disclosure may be to provide an electric vehicle that may be additionally equipped with a swappable battery, and a power source management method for the same.

Another object of the present disclosure may be to provide an electric vehicle, a main battery of which may be charged through a swappable battery without a separate additional voltage boosting means, and a power source management method for the same.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, an electric vehicle includes a motor, an inverter configured to exchange three-phase power with the motor, a main battery unit electrically connected to the inverter, the main battery unit including a first battery and a first battery management system (BMS) for controlling the first battery, the main battery unit being fixedly disposed in the electric vehicle, an on-board charger (OBC) connected between the main battery unit and the inverter, the OBC including a direct current (DC) converter, and a switch unit configured to selectively connect a connector and the DC converter to each other, or the connector and the motor to each other, in which, when a swappable battery unit including a second battery and a second BMS for controlling the second battery may be connected to the connector, the first BMS acquires second-battery information output by the second BMS.

The electric vehicle may further include a vehicle control unit configured to control the switching unit based on a vehicle state.

When the electric vehicle may be in a first state, the vehicle control unit may control the switching unit so that the connector and the DC converter may be connected to each other, and when the electric vehicle may be in a second state, the vehicle control unit may control the switching unit so that the connector and the motor may be connected to each other.

The vehicle control unit may determine the vehicle state based on at least one of a shift state, RPM of the motor, or a vehicle speed.

When the shift state may be a D stage (drive stage) or the vehicle speed may be greater than 0, the vehicle control unit may determine the vehicle state as the first state, and when shift state may be a P stage (park stage) or the vehicle speed may be 0, the vehicle control unit may determine the vehicle state as the second state.

The vehicle control unit may be configured to determine whether to perform charging control for charging the first battery with energy of the second battery based on the first-battery information and the second-battery information.

When the first battery may be in a chargeable state, and the second battery may be in a dischargeable state, the vehicle control unit may be configured to perform the charging control.

When the charging control may be performed, power boosting of the secondary battery may be performed in the DC converter in the first state, and the power boosting may be performed in the motor in the second state.

The first BMS may be configured to determine total available energy based on the second-battery information and first-battery information for the first battery.

The second-battery information may include cell type information and rated capacity information, and the first BMS may estimate a state of charge (SOC) of the second battery based on a voltage of the second battery in a no-load state, and estimate a state of health (SOH) of the second battery based on an internal resistance measured by application of a test current.

The first BMS may be configured to estimate the SOC based on an open circuit voltage table for each cell type, and estimate the SOH based on an internal resistance table for each cell type.

The vehicle control unit may be configured to forward a charging command to the first BMS upon determining to perform the charging control, and the first BMS may forward the charging command to the second BMS.

The second BMS may be configured to control a charging current or charging power based on a temperature of the second battery in response to start of the charging control.

The swappable battery unit may further include a cooling fan, and the second BMS may be configured to control an operation of the cooling fan based on a vehicle speed and a temperature of the second battery in response to start of the charging control.

When an SOC of the first battery reaches a target SOC after determining to perform the charging control, the vehicle control unit may be configured to suspend the charging control.

When a total path may be longer than a total remaining range determined based on available energy of the first battery and available energy of the second battery, the target SOC includes an SOC in which a charging reservation point or a chargeable point may be allowed to be reached.

In another embodiment of the present disclosure, an electric vehicle includes a motor, an inverter electrically connected to the motor, a main battery unit electrically connected to the inverter, the main battery unit including a first battery and a first battery management system (BMS) for controlling the first battery, the main battery unit being fixedly disposed in the electric vehicle, an on-board charger (OBC) connected between the main battery unit and the inverter, the OBC including a direct current (DC) converter, a switch unit configured to selectively connect a connector and the DC converter to each other, or the connector and the motor to each other, and a secondary battery mounting part configured to provide a space for accommodating a secondary battery unit including a second battery and a second BMS, the connector exposed in the space and the space accessible from outside by a driver, the secondary battery unit detachably mounted in the space and electrically connected to the connector, in which the first BMS is configured to acquire second-battery information output by the second BMS when the secondary battery unit is connected to the connector.

In an embodiment of the present disclosure, a power source management method for the electric vehicle, which includes a motor, an inverter electrically connected to the motor, a main battery unit fixedly disposed in the vehicle and including a first battery and a first BMS for controlling the first battery, and an on-board charger (OBC) including a direct current (DC) converter and connected between the main battery unit and the inverter, includes switching selectively between a connection of a connector and the DC converter and a connection of the connector and the motor upon a swappable battery unit being connected to the connector, the swappable battery unit including a second battery and a second BMS for controlling the second battery, outputting, by the second BMS, second battery information on the second battery, and acquiring, by the first BMS, the second battery information.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which may be included to provide a further understanding of the disclosure and may be incorporated in and constitute a part of this application, illustrate embodiment(s) of the disclosure and together with the description serve to explain the principle of the disclosure.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, embodiments of the present disclosure will be described in detail with reference to the accompanying drawings, and the same or similar elements will be given the same reference numerals regardless of reference symbols, and redundant description thereof will be omitted. In the following description, the terms "module" and "unit" for referring to elements may be assigned and used interchangeably in consideration of convenience of explanation, and thus, the terms per se do not necessarily have different meanings or functions. Further, in describing the embodiments disclosed in the present specification, when it may be determined that a detailed description of related publicly known technology may obscure the gist of the embodiments disclosed in the present specification, the detailed description thereof will be omitted. The accompanying drawings may be used to help explain various technical features and it should be understood that the embodiments presented herein may not be limited by the accompanying drawings. As such, the present disclosure should be construed to extend to any alterations, equivalents and substitutes in addition to those which may be particularly set out in the accompanying drawings.

Although terms including ordinal numbers, such as "first", "second", etc., may be used herein to describe various elements, the elements may not be limited by these terms. These terms may be generally used to distinguish one element from another.

When an element may be referred to as being "coupled" or "connected" to another element, the element may be directly coupled or connected to the other element. However, it should be understood that another element may be present therebetween. In contrast, when an element may be referred to as being "directly coupled" or "directly connected" to another element, it should be understood that there may be no other elements therebetween.

A singular expression includes the plural form unless the context clearly dictates otherwise.

In the present specification, it should be understood that a term such as "include" or "have" may be intended to designate that the features, numbers, steps, operations, elements, parts, or combinations thereof described in the specification may be present, and does not preclude the possibility of addition or presence of one or more other features, numbers, steps, operations, elements, parts, or combinations thereof.

In addition, the term "unit" or "control unit" included in the names of a hybrid control unit (HCU), a vehicle control unit (VCU), etc. may be merely a widely used term for naming a controller that controls a specific vehicle function, and does not mean a generic functional unit. For example, each controller may include a communication device that communicates with another controller or a sensor to control a function assigned thereto, a memory that stores an operating system, a logic command, input/output information, etc., and one or more processors that perform determination, calculation, decision, etc. necessary for controlling a function assigned thereto.

An embodiment of the present disclosure proposes that a secondary swappable battery (referred to as 'swappable battery' hereinafter in this description) be additionally connected to an electric vehicle together with a main battery electrically connected to a driving motor, so that power of the main battery and power of the swappable battery may be comprehensively managed.

First, a configuration of the electric vehicle according to an exemplary embodiment will be described with reference to FIG. 1.

Figure 1:
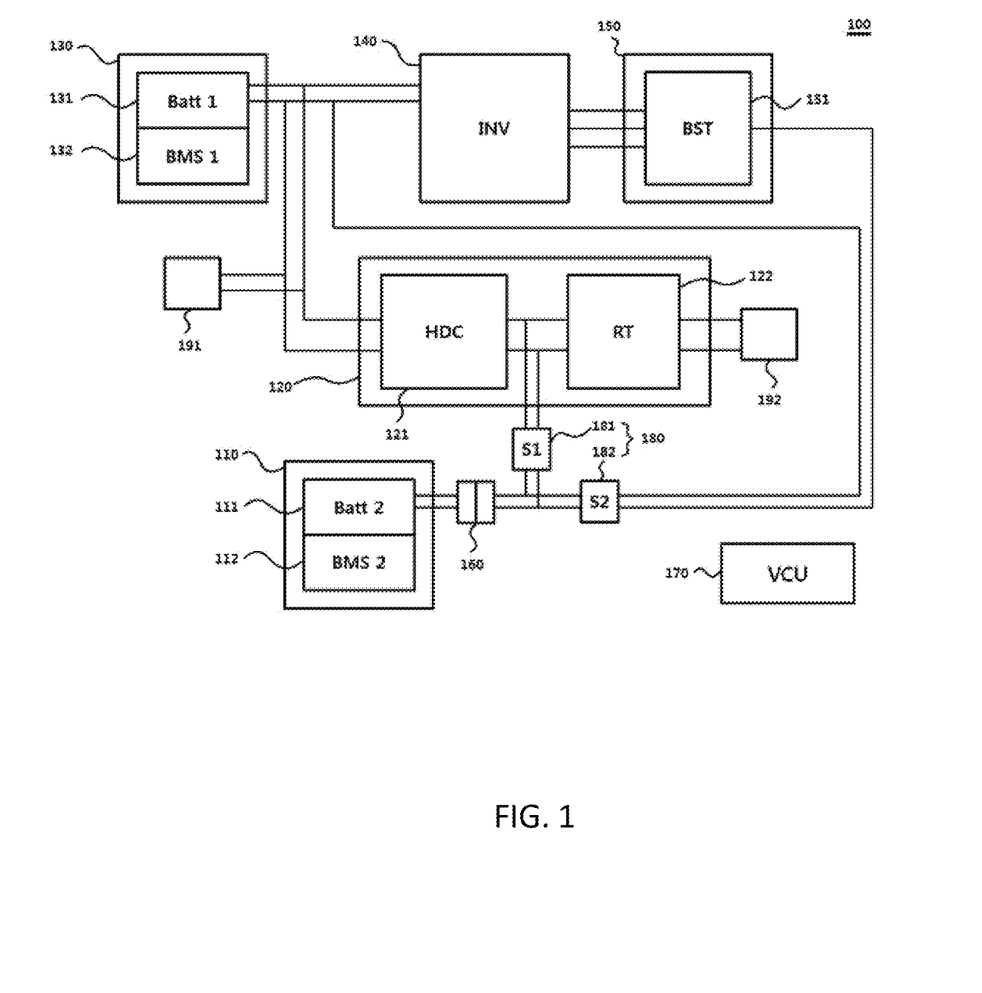
FIG. 1 is a block diagram illustrating an example of an electric vehicle equipped with a swappable battery according to an exemplary embodiment of the present disclosure.

FIG. 1 is a block diagram illustrating an example of the electric vehicle equipped with the swappable battery according to an exemplary embodiment of the present disclosure.

Referring to FIG. 1, the electric vehicle 100 according to the embodiment may include a swappable battery unit 110, an OBC 120, a main battery unit 130, an inverter 140, a driving motor 150, a connector 160, a VCU 170, a switch unit 180, a fast charging terminal 191, and a slow charging terminal 192.

FIG. 1 mainly illustrates elements related to the present embodiment, and it may be appreciated that fewer or more elements may be included in the actual implementation of the vehicle. In addition, unless otherwise described in FIG. 1, a line connecting respective elements may be a power cable, and illustration of a communication line according to a predetermined vehicle communication protocol (for example, controller area network (CAN)) may be omitted. However, mutual communication through the communication line may be allowed between the respective power electric (PE) elements 120, 140, 150, etc. or control units 112, 132, 170, etc.

Hereinafter, each element will be described.

The swappable battery unit 110 may include a second battery 111 and a second BMS 112. The second BMS 112 may be configured to manage a voltage, a current, a temperature, an SOC, an SOH, etc. of the second battery 111, and may control charging/discharging of the second battery 111. In addition, the second BMS 112 may be configured to set and manage upper and lower limits for the SOC of the second battery 111, and may store cell type information, rated capacity information, etc. of the second battery 111. Further, the second BMS 112 may be configured to transmit information about the second battery 111 to the outside (for example, a first BMS 132 and/or the DC converter 121) through a predetermined vehicle communication protocol (for example, controller area network (CAN)), and receive a command for charging/discharging of the second battery 111. For convenience, in the following description, it may be assumed that the vehicle communication protocol is CAN communication. However, it may be apparent to those skilled in the art that the protocol may be substituted with other protocols such as CAN-FD (Flexible Data-rate) and Ethernet.

Although not illustrated in FIG. 1, the swappable battery unit 110 may be provided with a cooling device for cooling the second battery 111, for example, an air cooling fan. In this case, the second BMS 112 may be configured to control an operating state of the fan in consideration of the state of the second battery 111, the vehicle speed, etc. The swappable battery unit 110 may be implemented using a natural cooling scheme, or may be cooled using water cooling by disposing a cooling pad through which coolant circulates in a portion of the vehicle in which the swappable battery unit 110 may be mounted.

Figure 6:
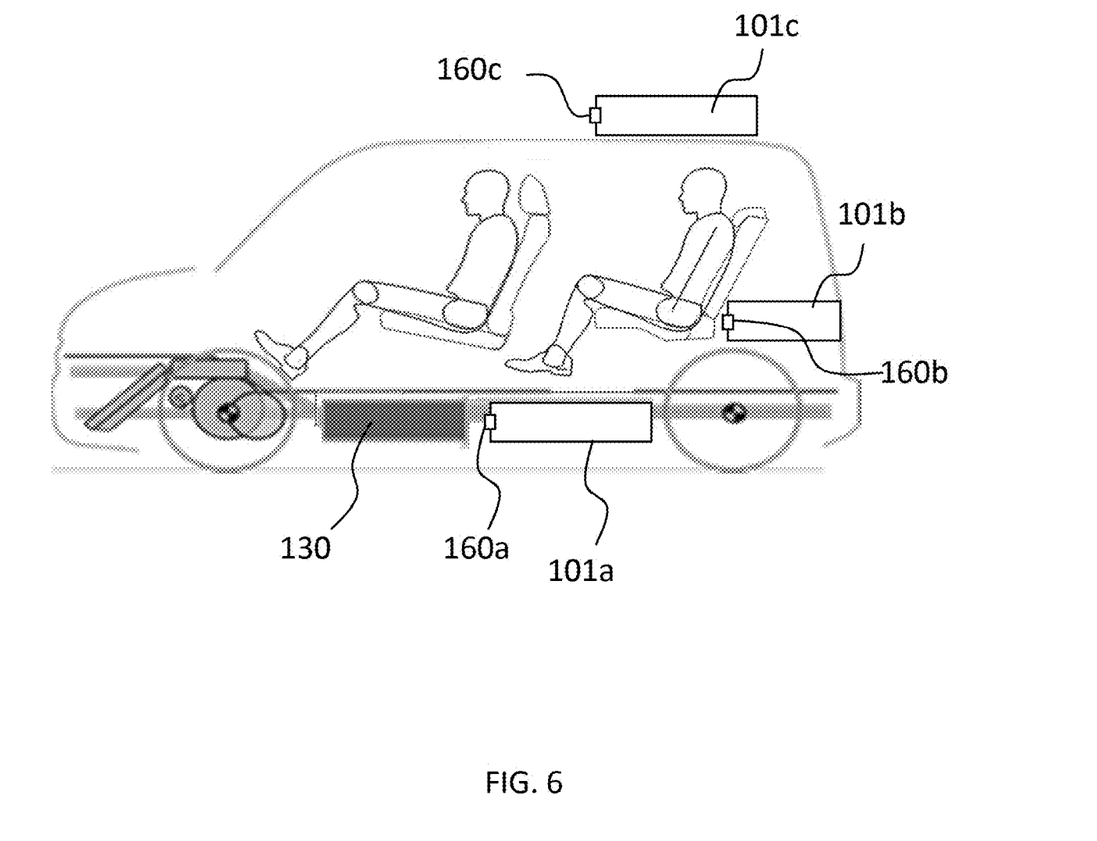
FIG. 6 is a conceptual structural drawing for showing three exemplary embodiments of a secondary battery mounting part.

Meanwhile, as shown in FIG. 6, the vehicle may comprise a battery mounting part 101a, 101b, 101c in which the connector 160a, 160b, 160c may be exposed and the swappable battery unit 110 may be detachably mounted. The battery mounting part 101a, 101b, 101c, as shown in FIG. 6, may be located on a roof of the electric vehicle, or in a trunk or a space under the vehicle. In another embodiment, the swappable battery may be connected to the vehicle in the form of a trailer provided with separate wheels. These are only examples, and the present disclosure may not be limited thereto. The battery mounting part may be configured such that the battery accommodating space is easily accessed by a driver and the swappable battery unit may be easily mounted on and detached from the battery mounting part so that the driver can install and remove the swappable battery unit 110 without difficulties. Also, the battery mounting part may comprise a fastening structure which fastens the swappable battery unit 110 firmly but can be released by an easy work.

The swappable battery unit 110 may be connected to a high-voltage system of the vehicle 100 through the connector 160. Here, being connected may mean that a high-voltage power cable and a CAN communication line (not illustrated) may be respectively connected.

The OBC 120 may include a high direct current to direct current (DC-DC) converter (HDC) 121 and a rectifier 122. Therefore, when general alternating current (AC) power may be input through the slow charging terminal 192, the rectifier 122 converts the AC power into direct current (DC) power, and the DC power converted through the HDC 121 may be boosted to a voltage corresponding to the high-voltage system including the first battery 131. Since high-voltage DC power may be supplied to the fast charging terminal 191, connection to the high-voltage system may be allowed without passing through a separate additional voltage boosting means.

Meanwhile, a first switch 181 may be connected through a branch between the HDC 121 and the rectifier 122. Accordingly, when the first switch 181 may be closed and the second switch 182 may be opened while the swappable battery unit 110 may be connected through the connector 160, the DC power of the second battery 111 may be boosted through the HDC 121. A reason therefor may be to boost a voltage of the second battery 111 and transfer the voltage to a first battery 131 side on the assumption that the second battery 111 of the swappable battery unit 110 may be smaller than the first battery 131 of the main battery unit 130, that is, has a low voltage/low capacity.

The main battery unit 130 may include the first battery 131 and the first BMS 132 as illustrated in the figure, and may be preferably permanently fixed to the vehicle. When the ignition key may be turned on (for example, IG On, EV Ready, etc.), the first BMS 132 may acquire state information of the second battery 111, which may be output by the second BMS 112, and determine the sum total energy of the first battery 131 and the second battery 111 based on the state information. When the second BMS 112 does not provide SOC or SOH information and only provides cell type information and rated capacity information, the first BMS 132 may estimate the SOC and the SOH of the second battery 111 based on the provided information, which will be described later with reference to FIG. 5.

In addition, upon receiving a charging command from the VCU 170, the first BMS 132 may forward the charging command to the second BMS 112 so that the first battery 131 may be charged with power of the second battery 111. Depending on the case, it may be possible to perform a control operation so that the second battery 111 may be charged with power of the first battery 131.

The inverter 140 may convert the DC power of the first battery 131 into three-phase power and supply the power to the motor 150, or convert power generated by the motor 150 through regenerative braking into direct current and supply the direct current to the first battery 131.

The motor 150 may output driving force using power supplied through the inverter 140 or may generate power through regenerative braking. In addition, as will be described later, through an operation of boosting 151, power supplied from the second battery 111 may be boosted in a state where the first switch 181 may be opened and the second switch 182 may be closed.

The VCU 170 may be configured to determine a required driving force in consideration of an accelerator pedal position sensor (APS) value of an APS (not illustrated), and determine a required braking force in consideration of a brake pedal position sensor (BPS) value of a BPS (not illustrated). The VCU 170 may be configured to determine the driving torque or regenerative braking torque to be output by the motor 150 in consideration of the required driving force or the required braking force, and forward a resultant torque command to a motor controller (not illustrated) or the inverter 140. In addition, the VCU 170 may be configured to forward a charging or discharging command for the first battery 131 to the first BMS 132 in consideration of the driving situation or the state of the first battery 131. In this instance, as will be described later, in performing a control operation to charge the first battery 131 with energy of the second battery 111, the VCU 170 may determine states of the first switch 181 and the second switch 182 depending on the operating state of the vehicle.

Further, the VCU 170 may comprehensively manage energy of the first battery 131 and the second battery 111 based on state information of each of the first battery 131 and the second battery 111 or total available energy information received from the first BMS 132.

Here, in comprehensive energy management of the first battery 131 and the second battery 111, it may be necessary to perform control in consideration of characteristics of the second battery 111, which may be a swappable battery. A reason therefor may be that, while control may be easy in a general high-voltage battery system since a main battery including cells having the same cell type and SOH may be used, it may be highly likely that a voltage, a cell type, an SOH, etc. may be different from those of the main battery when the swappable battery may be connected.

Table 1 below shows examples of combinations of various main batteries and swappable batteries.

TABLE 1

| Case | Main battery | Swappable battery | Capacity | SOH | Others |
|---|---|---|---|---|---|
| 1 | NCM811 (800 V/ 73 kWh) | NCM811 (NCM811 + α mixed (high Nickel Li-ion battery) | 30 kWh | 100% | Same cell Different capacities, same SOH |
| 2 | | NCM811 (Different mixing ratio compared to NE cell) | 32 kWh | 100% | Different cells Different capacities, same SOH |
| 3 | | LFP (Iron Phosphate) | 20 kWh | 100% | Different cells Different capacities, same SOH |
| 4 | | NCM622 (Apply reusable battery) | 25 kWh | 70% | Different cells Different capacities, different SOHs |

In Table 1, NCM denotes a composition of a battery cathode material, which means nickel, cobalt, and manganese in this order, and three numbers after NCM indicate a component ratio in the decile. That is, the NCM811 battery may mean that a ratio of nickel:cobalt:manganese in the cathode material may be 8:1:1.

Referring to Table 1, various illustrative combinations may be shown in which at least one of a cell type, a capacity, or an SOH may be different between a main battery and a swappable battery.

As described above, the type or state of each battery may be different. Moreover, even when the total available energy may be the sum of SOCs of the first battery 131 and the second battery 111, since the motor of the power driving unit 140 may be supplied with power from the first battery 131, the power of the second battery 111 may not be converted into the range without change. Accordingly, the VCU 150 may be configured to manage the total remaining range separately from the total available energy in consideration of path loss (for example, second battery discharging efficiency, DC converter efficiency, first battery charging efficiency, etc.) in charging the first battery 131 with the power of the second battery 111 and battery characteristics (cell type, SOH, etc.). In this way, the electric vehicle according to the present exemplary embodiment may provide more accurate total remaining range information to a driver.

Meanwhile, although not illustrated in FIG. 1, a main relay may be provided in a high-voltage power cable between the main battery unit 130 and the inverter 140.

Based on the above-described vehicle configuration, a voltage boosting method for charging the first battery 131 with the energy of the second battery 111 according to the exemplary embodiment will be described below with reference to FIG. 2 to FIG. 3B.

In the voltage boosting method according to the present embodiment, instead of providing a separate additional voltage boosting means for boosting the second battery 111, the voltage may be boosted through an on-board device of the electric vehicle under control of the switches 181 and 182.

Specifically, when the vehicle may be in motion (for example, "vehicle speed>0 kph" or "motor revolutions per minute (RPM)>0") or in a drivable state (for example, shift state D stage), the OBC 120, which operates on the premise that a charging plug may be fastened, generally does not operate. In addition, when the vehicle may be stopped (for example, "vehicle speed=0 kph", "motor RPM=0", shift state P stage, etc.), the motor 150 may not be generally driven. Therefore, when the vehicle may be in motion or in a drivable state, the voltage may be boosted through the HDC 121 of the OBC 120, and when the vehicle may be stopped, the voltage may be boosted using a boosting function of the motor 150.

First, voltage boosting through the HDC 121 of the OBC 120 will be described with reference to FIG. 2.

Figure 2:
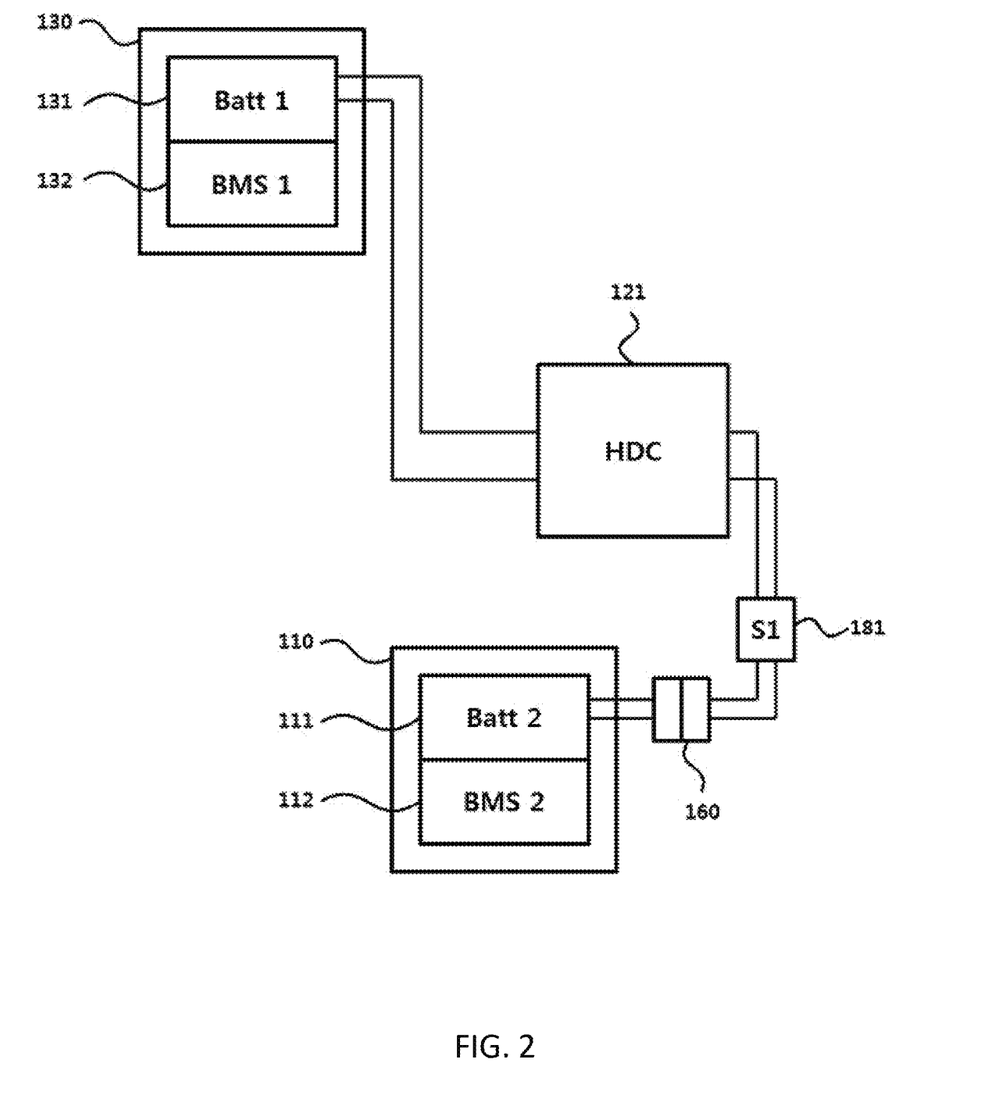
FIG. 2 illustrates a boosting situation using an OBC in the electric vehicle according to an exemplary embodiment of the present disclosure.
Figure 3A:
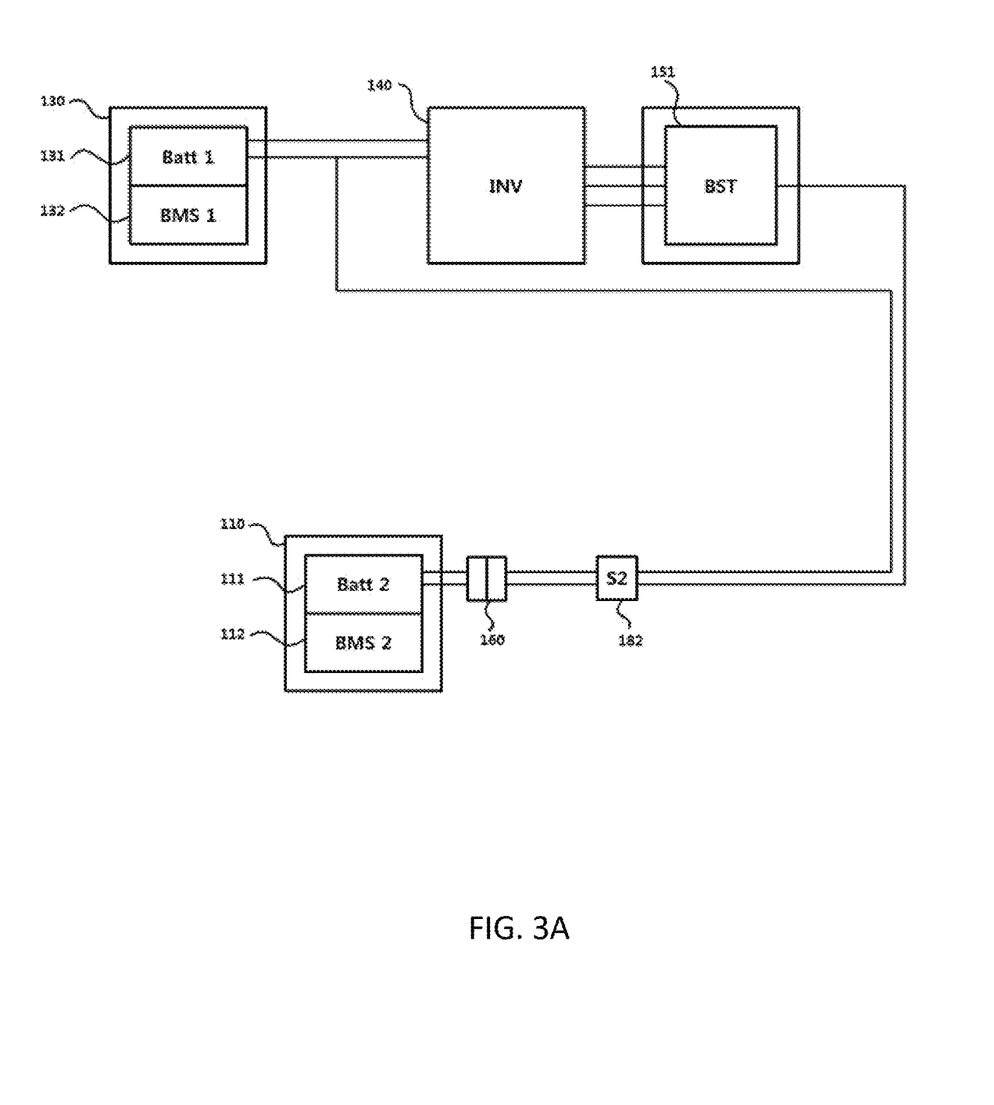
FIGS. 3A and 3B illustrate a boosting situation using a motor in the electric vehicle according to an exemplary embodiment of the present disclosure.

FIG. 2 illustrates a boosting situation using the OBC in the electric vehicle according to an exemplary embodiment of the present disclosure.

To aid in simple understanding, FIG. 2 only illustrates a power path formed by closing of the first switch 181 and opening of the second switch 182 between the main battery unit 130 and the swappable battery unit 110.

As illustrated in the figure, as the first switch 181 may be closed, the second battery 111 may be connected to the HDC 121 and may be boosted through the HDC 121, and thus it may be possible to charge the first battery 131 with the energy of the second battery 111.

Next, voltage boosting using the boosting function of the motor 150 will be described with reference to FIG. 3A to FIG. 3D.

FIG. 3A illustrates a boosting situation using the motor in the electric vehicle according to an exemplary embodiment of the present disclosure, and FG. 3B illustrates a circuit diagram during voltage boosting using the motor.

As in FIG. 2, to aid in simple understanding, FIG. 3A only illustrates a power path formed by opening of the first switch 181 and closing of the second switch 182 between the main battery unit 130 and the swappable battery unit 110.

Figure 3B:
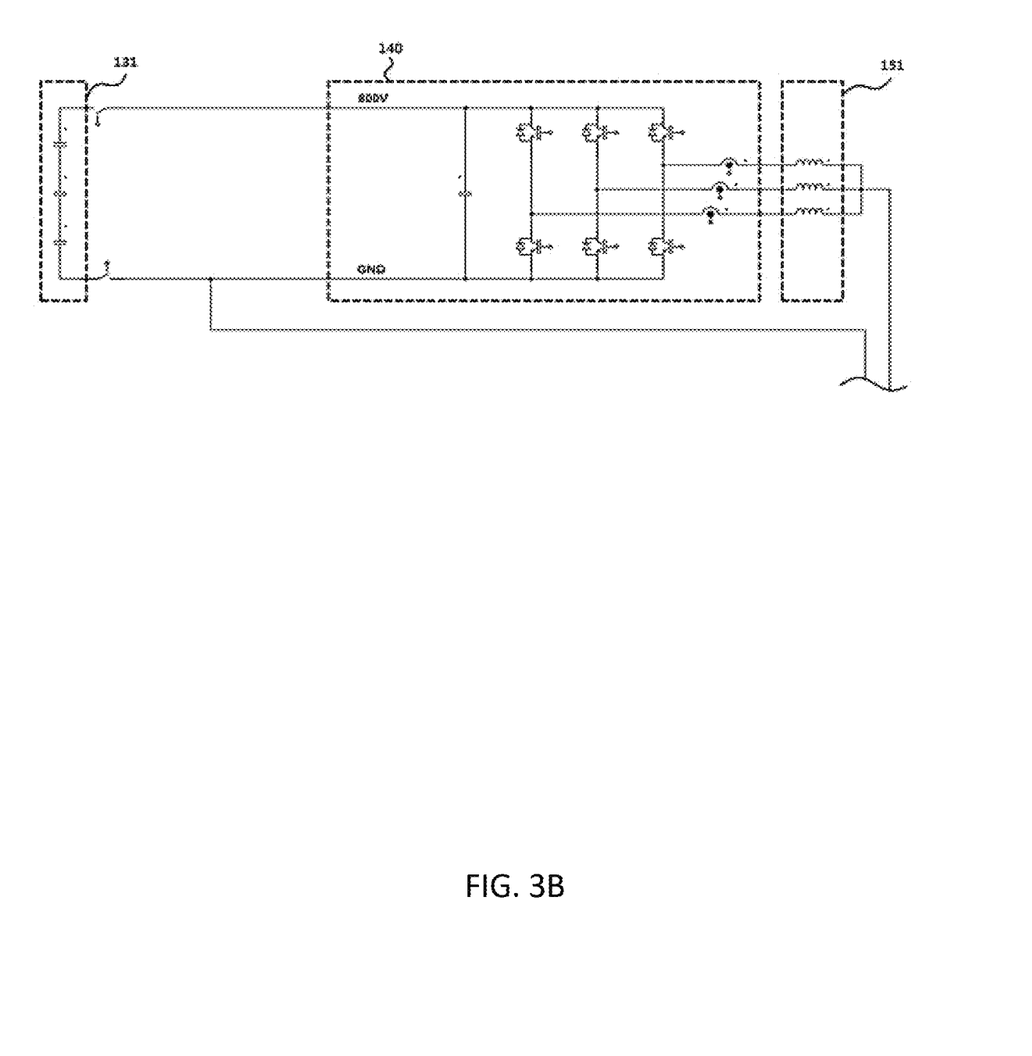

Referring to FIGS. 3A and 3B together, as the second switch 182 may be closed, the second battery 111 may be boosted through DC boosting, which may be activated in a state where the motor 150 does not rotate, and thus it may be possible to charge the first battery 131 with energy of the second battery 111.

Figure 3C:
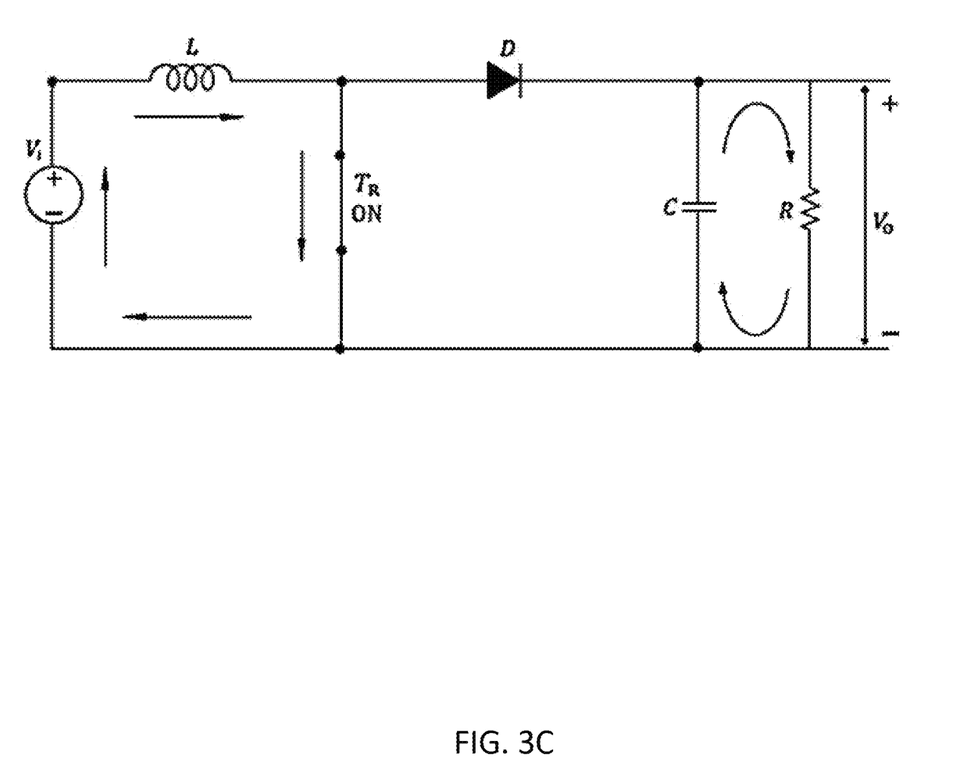
FIGS. 3C and 3D are diagrams describing a voltage boosting principle using the motor according to an exemplary embodiment of the present disclosure.
Figure 3D:
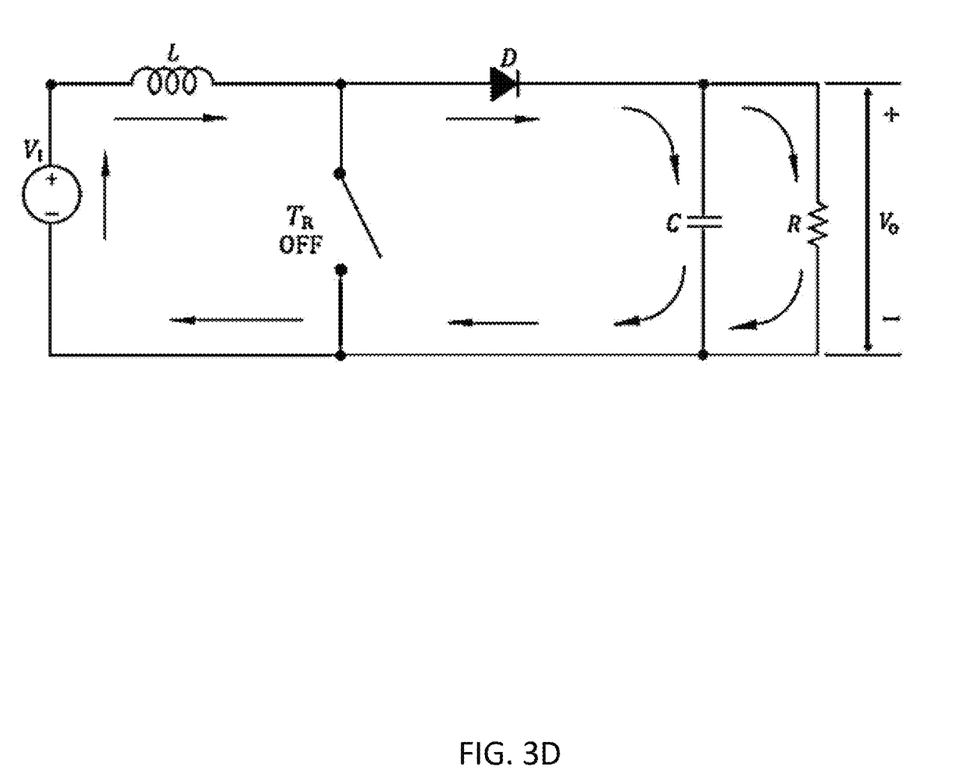

Hereinafter, the principle of DC boosting will be described with reference to FIGS. 3C and 3D. FIGS. 3C and 3D are diagrams describing a voltage boosting principle using the motor according to an embodiment of the present disclosure.

First, referring to FIG. 3C, a simplified circuit diagram of a boost converter including the inverter 140 and the motor 150 is illustrated. In the circuit diagram of FIG. 3C, an input voltage $V_I$ corresponds to a voltage of the second battery 111, and $V_O$ may be an output voltage of the boost converter and corresponds to a voltage supplied to the first battery 131. In addition, an inductor L may correspond to a winding for any one phase of the motor 150, and it may be possible to determine, according to the switching operation of the inverter 140, which phased winding corresponds to the inductor L among the plurality of the phases. In addition, the remaining elements, for example, a switch $T_R$, a diode D, a capacitor C, etc. may be a part of the inverter 140. However, the present disclosure may not be limited thereto. That is, it may be apparent that a person skilled in the art may implement the circuit diagrams illustrated in FIGS. 3C and 3D in various ways. For example, some of the remaining elements may be implemented as a device separate from a device included in the inverter 140'.

As illustrated in FIG. 3C, when the switch $T_R$ may be turned on, a current flows in the inductor L to accumulate energy, and the energy accumulated in the capacitor C may be consumed by a load-side resistor R. At this time, the diode D may block a charge of the capacitor C from flowing to the switch $T_R$.

An operation after energy is accumulated in the inductor L will be described with reference to FIG. 3D. Referring to FIG. 3D, as the switch $T_R$ may be turned off, the energy accumulated in the inductor L may be added to the input voltage $V_I$, so that the voltage passing through the diode D becomes $V_I+V_L$. That is, the output voltage $V_O$ becomes a value obtained by adding the energy voltage accumulated in the inductor to the input voltage, resulting in an effect that the input voltage may be boosted and transmitted to an output terminal.

Hereinafter, a power source management method using the above-described vehicle structure and switching method will be described with reference to FIGS. 4 and 5.

Figure 4:
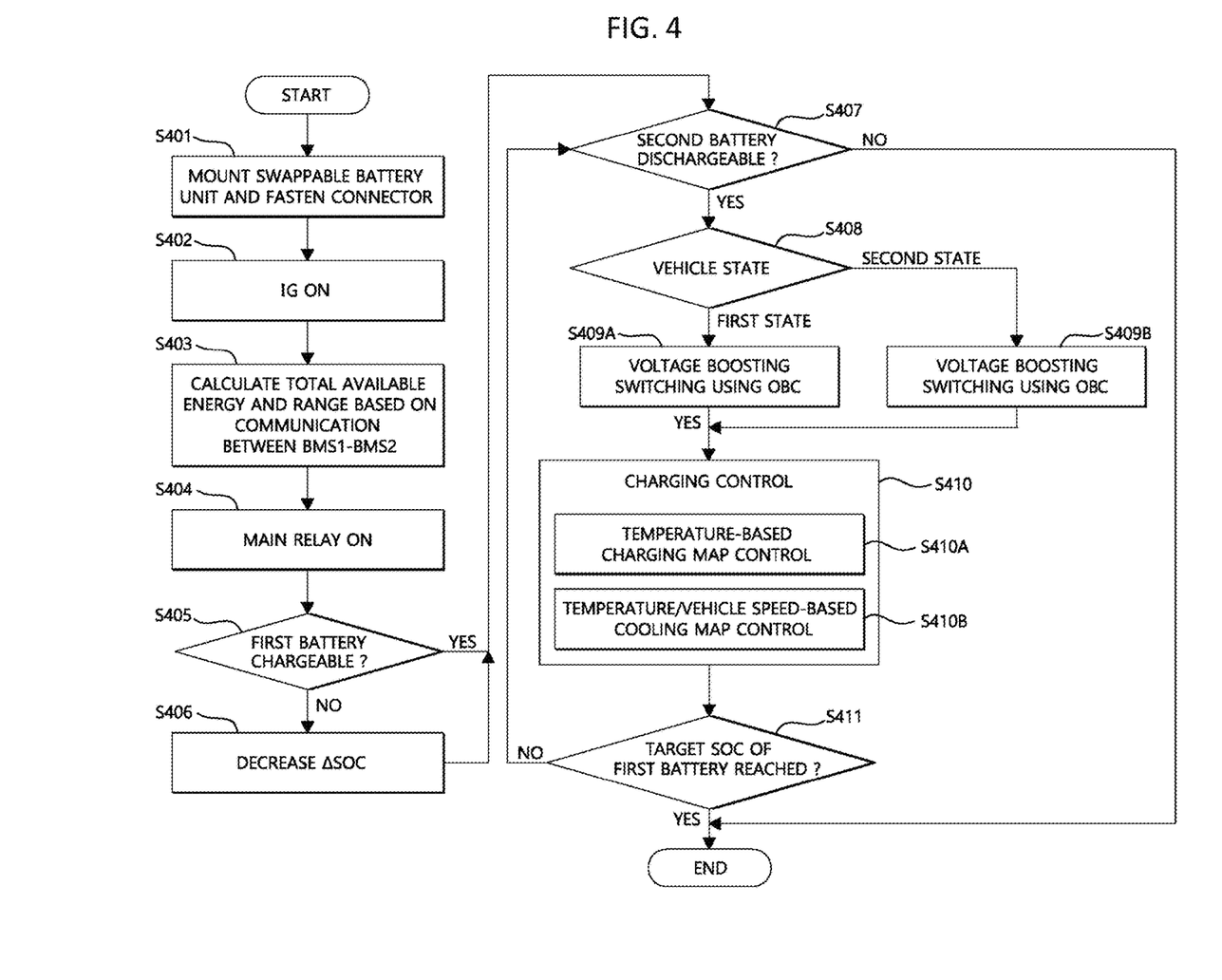
FIG. 4 is a flowchart illustrating an example of a power source management method for the electric vehicle according to an exemplary embodiment of the present disclosure.d

FIG. 4 is a flowchart illustrating an example of the power source management method for the electric vehicle according to an embodiment of the present disclosure.

Referring to FIG. 4, the swappable battery unit 110 may be mounted on the vehicle 100, and the connector 160 may be fastened (that is, connected to the high-voltage power cable and the communication line) (S401).

When the ignition key (or EV start button) may be turned on after the swappable battery unit 110 may be connected (S402), a power source of the second BMS 112, the first BMS 132, and a PE part (motor, inverter, OBC, etc.) controller may be turned on to start communication, and the total available energy and the total remaining range may be calculated using information obtained through the communication (S403).

In more detail, the second BMS 112 may forward information (SOC, SOH, temperature, voltage, etc.) of the second battery 111 to the first BMS 132. In addition, the first BMS 132 may sum the SOC of the second battery 111 and the SOC of the first battery 131 to determine the total available energy. Further, the VCU 170 may determine the total remaining range as described above based on the information possessed by the first BMS 132.

When the second BMS 112 may be configured as a cell management unit (CMU) not to directly output SOC and SOH information, and to only output limited information such as cell type information and rated capacity information, the first BMS 132 may estimate information of the second battery 111, which will be described with reference to FIG. 5.

Figure 5:
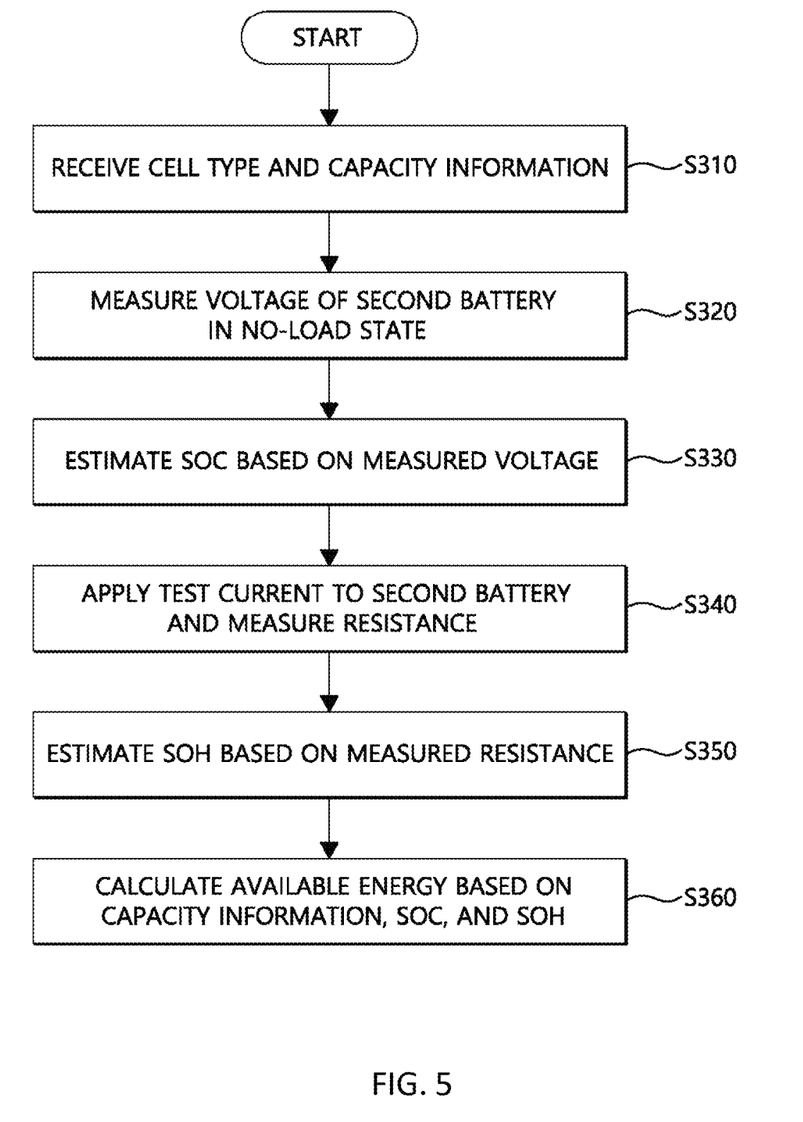
FIG. 5 is a flowchart illustrating an example of a process of estimating a state of a second battery of a swappable battery unit according to an exemplary embodiment of the present disclosure.

FIG. 5 is a flowchart illustrating an example of a process of estimating a state of the second battery of the swappable battery unit according to an embodiment of the present disclosure.

Referring to FIG. 5, first, the first BMS 132 may receive the cell type information and the rated capacity information of the second battery 111 from the second BMS 112 (S310). Thereafter, the first BMS 132 may measure the voltage of the second battery 111 in a no-load state (S320), and estimate the SOC based on the measured voltage (S330). To this end, the first BMS 132 may hold and refer to a table in which an SOC for an open circuit voltage (OCV) may be defined for each piece of cell type information (NCM x/y/z, LFP, etc.).

In addition, the first BMS 132 may apply a test current of a preset magnitude to the second battery 111 for a preset time to measure an internal resistance of the second battery 111 (S340), and estimate the SOH based on the measured resistance (S350). To this end, the first BMS 132 may hold and refer to a table in which the SOH for the resistance value may be defined for each piece of cell type information (NCM x/y/z, LFP, etc.).

The first BMS 132 may calculate the available energy of the second battery 111 based on the estimated SOC and SOH and the received rated capacity information (S360).

However, the method described above with reference to FIG. 5 is preferably applied in an environment in which the cell type of the second battery 111 provided in the swappable battery unit 110 may be standardized. A reason therefor may be that application of the SOC-OCV table and the SOH-resistance value table for each cell type, which may be held by the first BMS 132, may be ensured when standardization may be performed. When the cell type information indicates a cell type not previously defined in the table, the first BMS 132 may notify the VCU 170 of this situation to display a warning message.

Returning to FIG. 4 again, as the main relay may be closed (S404), the power of the first battery 131 may be transferred to the inverter 140, and the VCU 150 may determine whether the first battery may be charged in consideration of the state (SOC and temperature) and the load (including driving energy and electric field energy) of the first battery 131 (S405).

For example, when the temperature of the first battery 131 may be within a preset threshold temperature and a current SOC may be lower than a preset upper limit of the SOC, the VCU 150 may determine that the first battery 131 may be charged (Yes in S405).

When it may be determined that the first battery 131 cannot be charged since the current SOC may be high (No in S405), the VCU 170 may wait until the SOC of the first battery 131 may be decreased by a certain amount (ΔSOC) (S406).

Thereafter, the VCU 170 may determine whether the second battery 111 may be in a dischargeable state, for example, whether the SOC of the second battery 111 may be greater than the preset lower limit of the SOC (S407). When it may be determined that the second battery 111 may be discharged (Yes in S407), the VCU 170 may determine a vehicle state to determine a voltage boosting means (S408).

Here, the vehicle state may include a first state indicating a state in which the vehicle may be in motion or in the drivable state and a second state in which the vehicle may be stopped. In order to determine the vehicle state, the VCU 170 may refer to at least one of the shift state, the motor RPM, or the vehicle speed. For example, as described above, when "vehicle speed>0 kph", "motor RPM>0", and/or the shift state may be the D stage, the vehicle state may be determined as the first state, and when "vehicle speed=0 kph", "motor RPM=0", and/or the shift state may be the P stage, the vehicle state may be determined as the second state.

When the vehicle state may be determined as the first state, the VCU 170 may perform a control operation to close the first switch 181 and open the second switch 182 in order to use the HDC 121 of the OBC 120 as the voltage boosting means (S409A). On the other hand, when the vehicle state may be determined as the second state, the VCU 170 may perform a control operation to open the first switch 181 and close the second switch 182 in order to use a function of the boosting 151 of the motor 150 as the voltage boosting means (S409B).

As switching control may be performed, the VCU 170 forwards a charging command to the first BMS 132, and as the charging command may be forwarded to the second BMS 112 from the first BMS 132, charging control for charging the first battery 131 with the power of the second battery 111 may be performed (S410).

A charging control (S410) process may include temperature-based charging map control 410A and temperature/vehicle speed-based cooling map control 410B.

The temperature-based charging map control 410A may mean that the second BMS 112 controls discharging of the second battery 111 with reference to a charging map in which charging power or current according to the temperature of the second battery 111 may be defined. For example, the charging map may have a form shown in the following Table 2.

TABLE 2

| Temperature (° C.) | ... (Lower limit of charging temperature) | A-10 | A-5 | Room temperature (A) | A + 5 | A + 10 | ... (Upper limit of charging temperature) |
|---|---|---|---|---|---|---|---|
| Charging power (kW) (or current(A)) | A | b | c | d | e | f | g |
| Cut-off voltage (V) | Y | | | X | | | Z |

Referring to Table 2, the charging map may have a form in which charging power or charging current may be defined along with a cut-off voltage according to a plurality of temperature ranges. However, it may be apparent to those skilled in the art that this charging map may be an example and that various modifications may be possible.

Next, the temperature/vehicle speed-based cooling map control 410B may mean controlling a cooling means according to a cooling scheme of the swappable battery unit 110. For example, when the swappable battery unit 110 has a cooling fan as the cooling means, the second BMS 112 may control the cooling fan with reference to a cooling map shown in the following Table 3.

TABLE 3

| Vehicle speed Temperature ° C. | A | A + 5 | A + 10 | A+ ... (~maximum speed) |
|---|---|---|---|---|
| Minimum cooling start temperature | X | X + y | X + y1 | X + y2 |
| T + 5 | X1 | X1 + y' | X1 + y1' | X1 + y2' |
| T + 10 | X2 | X2 + y'' | X1 + y1'' | X1 + y2'' |
| T+ ... (~maximum battery temperature) | X3 | X2 + z | X1 + z1 | X1 + z2 |

Referring to Table 3, the cooling map may have a form in which the number of operating stages or duty of the cooling fan may be defined according to a plurality of temperature ranges and vehicle speed ranges. However, it may be apparent to those skilled in the art that this cooling map may be an example and that various modifications may be possible.

The charging control (S410) process may continue until the SOC of the first battery 131 reaches a target SOC (No in S411), while the second battery 111 may be discharged (Yes in S407). In other words, when the SOC of the first battery 131 reaches the target SOC (Yes in S411), or when discharging of the second battery 111 becomes impossible (No in S407), the charging control (S410) process may be terminated.

Here, the target SOC may be set using various schemes. As an example, the target SOC may refer to full charge (that is, SOC 100%) or may refer to an upper limit of the SOC preset in the first BMS 132 (BMS SOC upper limit). As another example, when path information may be acquired by the VCU 170, and when a total (or round-trip) path length may be longer than the total remaining range on the assumption that all the energy of the first battery 131 and the second battery 111 has been used, the target SOC may be determined based on energy required to arrive at a charging reservation point or a chargeable point. As another example, a lower limit of the SOC of the first battery 131 that may be uncomfortable for each user (that is, an SOC causing range anxiety due to a decrease in SOC) may be additionally considered in setting the target SOC.

According to the various embodiments of the present disclosure described above, it may be possible to prevent unnecessary increase in vehicle price or weight by allowing the swappable battery to be additionally mounted in addition to the main battery.

In addition, it may be possible to acquire the state of the mounted swappable battery using various schemes and to perform comprehensive management with the energy of the main battery.

In addition, it may be possible to charge the main battery through the swappable battery without a separate additional voltage boosting means by boosting the voltage through the motor or the OBC depending on the vehicle conditions.

The effects obtainable in the present disclosure may not be limited to the above-mentioned effects, and other effects not mentioned herein may be clearly understood by those of ordinary skill in the art to which the present disclosure belongs from the above description.

The present disclosure described above may be implemented as computer-readable code on a medium in which a program may be recorded. The computer-readable medium includes all types of recording devices in which data readable by a computer system may be stored. Examples of the computer-readable medium include a hard disk drive (HDD), a solid-state drive (SSD), a silicon disk drive (SDD), a ROM, a RAM, a CD-ROM, a magnetic tape, a floppy disk, an optical data storage device, etc. Therefore, the above detailed description should not be construed as restrictive and should be considered as illustrative in all respects. The scope of the present disclosure should be determined by a reasonable interpretation of the appended claims, and all modifications within the equivalent scope of the present disclosure may be included in the scope of the present disclosure.

What is claimed is:

1. An electric vehicle comprising:
   a motor;
   an inverter configured to exchange three-phase power with the motor;
   a main battery unit electrically connected to the inverter, the main battery unit including a first battery and a first battery management system (BMS) for controlling the first battery, the main battery unit being fixedly disposed in the electric vehicle;
   an on-board charger (OBC) connected between the main battery unit and the inverter, the OBC including a high direct current to direct current (DC-DC) converter; and
   a first switch configured to selectively connect a connector and the DC-DC converter to each other, a second switch configured to selectively connect the connector and the motor to each other,
   wherein the first BMS is configured to acquire second-battery information output by a second BMS when a swappable battery unit including a second battery and the second BMS for controlling the second battery is connected to the connector.

2. The electric vehicle according to claim 1, further comprising a vehicle control unit configured to control the switching unit based on a vehicle state.

3. The electric vehicle according to claim 2, wherein, when the electric vehicle is in a first state, the vehicle control unit is configured to control the first switch so that the connector and the DC-DC converter are connected to each other, and when the electric vehicle is in a second state, the vehicle control unit is configured to control the second switch so that the connector and the motor are connected to each other.

4. The electric vehicle according to claim 3, wherein the vehicle control unit is configured to determine the vehicle state based on at least one of a shift state, RPM of the motor, or a vehicle speed.

5. The electric vehicle according to claim 4, wherein, when the shift state is a D stage or the vehicle speed is greater than 0, the vehicle control unit is configured to determine the vehicle state as the first state, and when the shift state is a P stage or the vehicle speed is 0, the vehicle control unit is configured to determine the vehicle state as the second state.

6. The electric vehicle according to claim 3, wherein the vehicle control unit is configured to determine whether to perform charging control for charging the first battery with energy of the second battery based on first-battery information and the second-battery information.

7. The electric vehicle according to claim 6, wherein, when the first battery is in a chargeable state, and the second battery is in a dischargeable state, the vehicle control unit is configured to perform the charging control.

8. The electric vehicle according to claim 6, wherein, when the charging control is performed, power boosting of the second battery is performed in the DC-DC converter in the first state, and the power boosting is performed in the motor in the second state.

9. The electric vehicle according to claim 6, wherein:
   the vehicle control unit forwards a charging command to the first BMS upon determining to perform the charging control; and
   the first BMS forwards the charging command to the second BMS.

10. The electric vehicle according to claim 6, wherein the second BMS controls a charging current or charging power based on a temperature of the second battery in response to a start of the charging control.

11. The electric vehicle according to claim 6, wherein:
    the swappable battery unit further includes a cooling fan; and
    the second BMS controls an operation of the cooling fan based on a vehicle speed and a temperature of the second battery in response to a start of the charging control.

12. The electric vehicle according to claim 6, wherein, when an SOC of the first battery reaches a target SOC after determining to perform the charging control, the vehicle control unit suspends the charging control.

13. The electric vehicle according to claim 12, wherein, when a total path is longer than a total remaining range determined based on available energy of the first battery and available energy of the second battery, the target SOC includes an SOC in which a charging reservation point or a chargeable point is allowed to be reached.

14. The electric vehicle according to claim 1, wherein the first BMS determines total available energy based on the second-battery information and first-battery information for the first battery.

15. The electric vehicle according to claim 14, wherein:
    the second-battery information includes cell type information and rated capacity information; and
    the first BMS estimates a state of charge (SOC) of the second battery based on a voltage of the second battery in a no-load state, and estimates a state of health (SOH) of the second battery based on an internal resistance measured by application of a test current.

16. The electric vehicle according to claim 15, wherein the first BMS estimates the SOC based on an open circuit voltage table for each cell type, and estimates the SOH based on an internal resistance table for each cell type.

17. An electric vehicle comprising:
    a motor;
    an inverter electrically connected to the motor;
    a main battery unit electrically connected to the inverter, the main battery unit including a first battery and a first battery management system (BMS) for controlling the first battery, the main battery unit being fixedly disposed in the electric vehicle;
    an on-board charger (OBC) connected between the main battery unit and the inverter, the OBC including a direct current (DC) converter;
    a first switch configured to selectively connect a connector and the DC-DC converter to each other, a second switch configured to selectively connect the connector and the motor to each other; and
    a secondary battery mounting part configured to provide a space for accommodating a secondary battery unit including a second battery and a second BMS, the connector exposed in the space and the space accessible from outside by a driver, the secondary battery unit detachably mounted in the space and electrically connected to the connector,
    wherein the first BMS is configured to acquire second-battery information output by the second BMS when the secondary battery unit is connected to the connector.

18. A power source management method for the electric vehicle which includes a motor, an inverter electrically connected to the motor, a main battery unit fixedly disposed in the vehicle and including a first battery and a first BMS for controlling the first battery, and an on-board charger (OBC) including a direct current (DC) converter and connected between the main battery unit and the inverter, the power source management method comprising:

switching selectively between a connection of a connector and the and a connection of the connector and the motor upon a swappable battery unit being connected to the connector, the swappable battery unit including a second battery and a second BMS for controlling the second battery;

outputting, by the second BMS, second battery information on the second battery; and     acquiring, by the first BMS, the second battery information.

\* \* \* \* \*